A. J. BOWEN.
Tobacco Pipe.
No. 1,929. Reissued April 4, 1865.
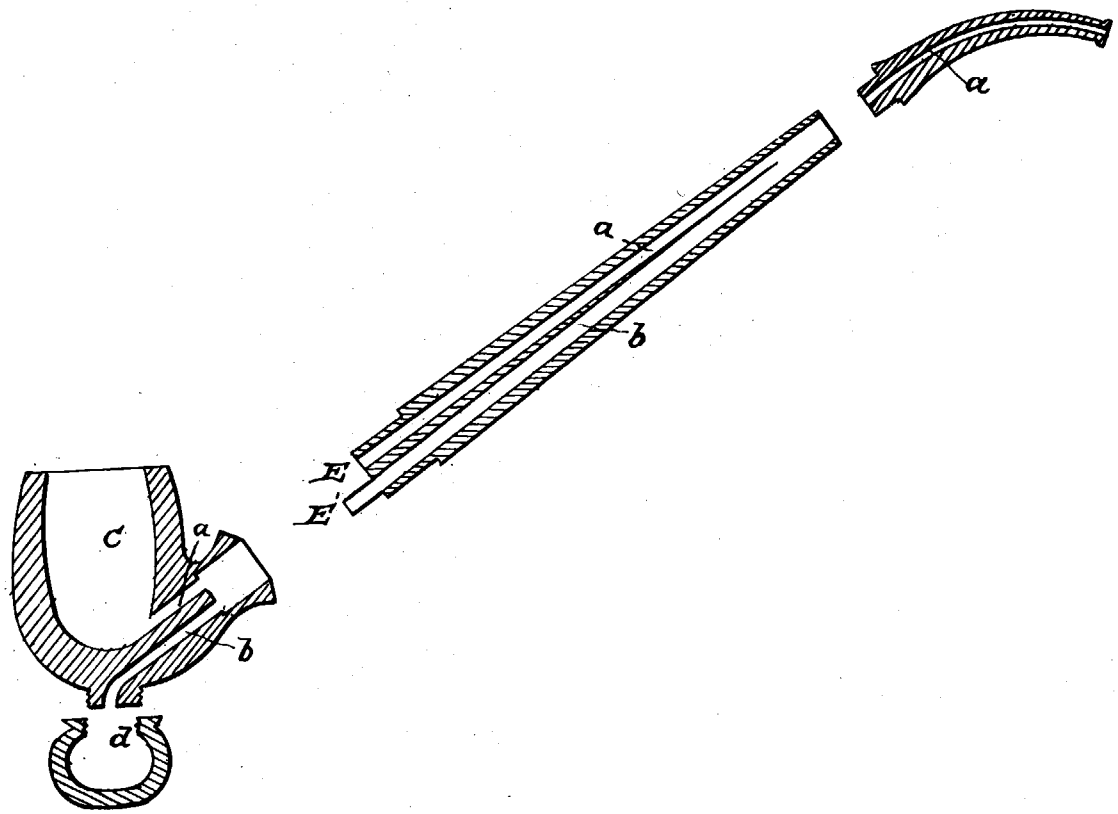
WITNESSES
Geo. C. Lambright
T. Smith
INVENTOR.
A. K. Bowen.
by Atty
Thos. T. Everett

UNITED STATES PATENT OFFICE.

THE TOBACCO PIPE COMPANY, OF BALTIMORE, MARYLAND, ASSIGNEES, BY MESNE ASSIGNMENTS, OF ANDREW J. BOWEN.

TOBACCO-PIPE.

Specification forming part of Letters Patent No. 35,559, dated June 10, 1862; Reissue No. 1,929, dated April 4, 1865.

*To all whom it may concern:*

Be it known that ANDREW J. BOWEN, of the city of Baltimore, in the State of Maryland, invented a certain new and useful Improvement in Pipes for Smoking-Tobacco, &c.; and it is hereby declared that the following is a full, clear, and exact description thereof, reference being had to the accompanying drawings, which form a part of this specification.

This improvement is designed to prevent the nicotine or any offensive fluid or material produced in smoking the tobacco or other substance from reaching the mouth, and thus relieve the smoker from the evils of the pipe of the usual or common construction.

The bowl *c* of a pipe having my improvement can be made of any desirable shape or form, and of any material used in making smoking-pipes, as can also the stem, mouth-piece, and cup or receptacle. To the bottom of the bowl a cup or receptacle, *d*, is so attached, by screw-threads upon the surfaces of the bowl or body and cup in contact or by any other convenient means, that it can readily be detached and cleaned. In this cup can be put a piece of sponge or any other absorbing substance for retaining the fluid passed down to the cup. By thus attaching the cup to the body or bowl of the pipe the fluid will certainly reach the cup, which would not be the case if the cup had the screw-threads or other means on its exterior surface, and was screwed or otherwise connected to the bowl by being screwed into a hole or a stem in the bowl, as it will readily be perceived that the fluid would then be very apt to pass down between the surfaces in contact to the exterior of the cup, making it unclean and offensive. The bowl of the pipe, when in use, will be in communication with one tube or channel, *a*, of the stem, while the cup will be in communication with another tube or channel, *b*. The tube *b* can extend beyond the stem a short distance, as indicated at E', and as the extension will fit into the channel *b* of the pipe, it will serve to strengthen the connection between the bowl or body of the pipe and the stem. The two tubes or channels *a* and *b* will be distinct and separate through such portion of the stem as will leave a certain space between their point of union and the mouth-piece for the condensing of the vapor within the stem. As is shown by the drawing, the condensed vapor or the fluid of condensation will find its way to the cup or receptacle down the passage *b*, as will also the saliva from the mouth of the smoker, and thus the smoke which will pass into the mouth of the smoker will be pure and free from nicotine and from all noxious or offensive vapors or liquid.

The stem being constructed as here recited and shown can be connected to a mouth-piece of any kind ordinarily used, and both the mouth-piece and the stem can be detached from the pipe and from each other, so that each and every part of this pipe can easily and readily be cleaned; and in case of breakage of any one piece its place can be easily supplied.

What is claimed as the invention of the said A. J. BOWEN, and desired to be secured by Letters Patent, is—

1. The two tubes or channels *a* and *b* in the stem, in combination with the bowl *c* and cup or receptacle *d*, as herein set forth.

2. The device by which the cup or receptacle *d* is attached to the bowl *c*—*i. e.*, the male screw on the latter and the female screw on the former, or their equivalents—in combination with the channels *a* and *b*, bowl *c*, and cup *d*, substantially as shown and described, and for the purposes set forth.

This specification signed this 10th day of May, 1864.

LEVI K. BOWEN,
*President of the Tobacco Pipe Co. of Baltimore.*
C. WENDELL,
*Secretary of the Tobacco Pipe Co. of Baltimore.*

Witnesses:
A. S. GUYTON,
FRANK BIERBONER,
THOS. T. EVERETT,
T. SMITH.